United States Patent
Hirata et al.

(10) Patent No.: US 11,976,748 B2
(45) Date of Patent: May 7, 2024

(54) DIAPHRAGM VALVE

(71) Applicant: FUJIKIN INCORPORATED, Osaka (JP)

(72) Inventors: Kaoru Hirata, Osaka (JP); Masaaki Nagase, Osaka (JP); Atsushi Hidaka, Osaka (JP); Kazuyuki Morisaki, Osaka (JP); Keisuke Ideguchi, Osaka (JP); Kosuke Sugimoto, Osaka (JP); Masafumi Kitano, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/638,772

(22) PCT Filed: Jun. 12, 2020

(86) PCT No.: PCT/JP2020/023183
§ 371 (c)(1),
(2) Date: Feb. 25, 2022

(87) PCT Pub. No.: WO2021/039027
PCT Pub. Date: Mar. 4, 2021

(65) Prior Publication Data
US 2022/0268365 A1    Aug. 25, 2022

(30) Foreign Application Priority Data

Aug. 30, 2019    (JP) ................................ 2019-159103

(51) Int. Cl.
*F16K 7/17*    (2006.01)
*C09D 127/12*    (2006.01)
(Continued)

(52) U.S. Cl.
CPC .............. *F16K 7/17* (2013.01); *C09D 127/12* (2013.01); *F16K 7/14* (2013.01); *F16K 25/005* (2013.01)

(58) Field of Classification Search
CPC ..... F16K 7/14; F16K 7/16; F16K 7/17; F16K 7/123; F16K 7/126; F16K 25/005; F16K 27/0236
See application file for complete search history.

(56) References Cited

U.S. PATENT DOCUMENTS 4,591,520 A * 5/1986 Brodie ................. F16K 17/1633
428/428
7,243,903 B2 * 7/2007 Wincek ................... F16K 7/126
251/368

(Continued)

FOREIGN PATENT DOCUMENTS

JP    S62-101976 A    5/1987
JP    2012026476 A *    2/2012

(Continued)

OTHER PUBLICATIONS

International Search Report issued in PCT/JP2020/023183; dated Aug. 11, 2020.

*Primary Examiner* — Hailey K. Do
(74) *Attorney, Agent, or Firm* — Studebaker & Brackett PC

(57) ABSTRACT

A diaphragm valve includes a body (3) having a flow path (2), a seat (4) formed in the flow path (2), a metal diaphragm (5) for opening and closing the flow path (2), a pair of clamping parts (6) and (7) for claiming peripheral edge portions of the metal diaphragm (5) to fix the metal diaphragm (5) to the body (3), and an actuator (8) for abutting the metal diaphragm (5) to the seat (4) or separating the metal diaphragm from the seat (4), wherein a fluorine resin coating is formed on a seat side surface (5a) of the metal diaphragm (5) at least in a contact region (B-A) with the seat (Continued)

(4) in a region (C) surrounded by a clamping region (D-C) between the seat side surface (5a) and one of the pair of clamping portions (6, 7), excluding the clamping region (D-C).

5 Claims, 7 Drawing Sheets

(51) Int. Cl.
*F16K 7/14* (2006.01)
*F16K 25/00* (2006.01)

(56) References Cited

U.S. PATENT DOCUMENTS

| | | |
|---|---|---|
| 2006/0071192 A1 | 4/2006 | Ohmi et al. |
| 2006/0175573 A1 | 8/2006 | Ohmi et al. |
| 2012/0273061 A1 | 11/2012 | Hidaka et al. |
| 2013/0032600 A1* | 2/2013 | Umezaki ............... F16K 7/14 251/331 |
| 2014/0070128 A1* | 3/2014 | Hayashi ............... F16K 25/005 251/359 |
| 2017/0292622 A1* | 10/2017 | Hayashi ............... G05D 7/0635 |
| 2018/0071702 A1 | 3/2018 | Hidaka et al. |

FOREIGN PATENT DOCUMENTS

| | | |
|---|---|---|
| KR | 10-2005-0101322 A | 10/2005 |
| KR | 10-2009-0057928 A | 6/2009 |
| WO | 2004/074722 A1 | 9/2004 |
| WO | 2011/067891 A1 | 6/2011 |
| WO | 2016/174832 A1 | 11/2016 |

* cited by examiner

DIAPHRAGM VALVE

TECHNICAL FIELD

The present invention relates to a diaphragm valve, particularly to a diaphragm valve comprising a metal diaphragm, which is suitable for controlling a flow rate of a process gas used in semiconductor manufacturing.

BACKGROUND ART

Conventionally, a diaphragm valve having a metal diaphragm is known for controlling the flow rate of a process gas used in semiconductor manufacturing (e.g., Patent Documents 1 and 2). The metal diaphragm of this type of diaphragm valve is formed of an ultra-thin metal plate such as spron, but there is a variation in processing accuracy, and by repeating contact with and separate from a seat to open and close a flow path, damage and wear may occur, resulting in seat leak. There is also a problem that the diaphragm corroded depending on the type of gas flowing through.

Therefore, for example, as shown in FIG. 9, a diaphragm valve is known to prevent damage and wear of the metal diaphragm 5 and the seat leak by applying a fluorine resin coating F to the entire surface of the side in contact with the process gas of the metal diaphragm 5, so that the corrosion resistance can be improved, and contact between the metal diaphragm 5 and the seat 4 becomes soft touch (Patent Document 3, etc.). In FIG. 9, reference numerals 40 and 41 are clamping portions for fixing peripheral edge portions of the metal diaphragm 5 by clamping and is formed of a metal gasket or the like.

PRIOR-ART DOCUMENT

Patent Documents

[Patent literature 1] International Publication No. 2011/067891 brochure
[Patent literature 2] International Publication No. 2016/174832 brochure
[Patent literature 3] International Publication No. 2004/074722 brochure

SUMMARY OF INVENTION

Technical Problem

However, in the conventional diaphragm valve formed with the fluorine resin coating on the entire surface of the seat side of the metal diaphragm, the gas in the flow path may leak to the outside of the diaphragm valve. Further, as shown in an example of a valve seat described in Patent Document 3, when the valve seat is made of resin, the thickness of the valve seat made of resin is about several mm itself, and when the valve seat is used in a high-temperature state, the thickness changes greatly by thermal expansion or creep due to aging. As an actuator for operating a valve element, for example, in the case of a piezo control valve, the general stroke range is less than 100 μm, and it is impossible to cope with the change in valve seat thickness due to thermal expansion or creep, and it is impossible to cope with the specification in a high-temperature state.

Solution to Problem

As a result of intensive research, the present inventors have found that when flowing a gas having a small molecular diameter such as helium gas into the flow path of the diaphragm valve, due to a permeation leak of the gas permeating through the resin coating of the metal diaphragm, the gas G leaks from the peripheral edge portions of the metal diaphragm 5 to the outside of the diaphragm valve as indicated by a broken line arrow in FIG. 9.

Therefore, the diaphragm valve according to the present invention includes a body having a flow path formed therein, a seat formed in the flow path, a metal diaphragm for opening and closing the flow path by abutting on or separating from the seat, a pair of clamping portions for clamping peripheral edge portions of both side surfaces of the metal diaphragm respectively to fix the metal diaphragm to the body, and an actuator for abutting the metal diaphragm on the seat or separating the metal diaphragm from the seat, wherein a fluorine resin coating is formed on a seat side surface of the metal diaphragm in a region excluding a clamping region between the seat side surface and the clamping portion, and at least in a contact region with the seat in a region surrounded by the clamping region.

In one embodiment, the fluorine resin coating is formed in an entire region surrounded by the clamping region.

In one embodiment, the fluorine resin coating is formed only in the contact region with the seat.

In addition, in one embodiment, the fluorine resin coating is formed only in the contact region with the seat and the region surrounded by the contact region with the seat.

In one embodiment, the clamping portion in contact with the surface of the seat side of the metal diaphragm is made of metal.

In addition, in one embodiment, the fluorine resin coating has a surface roughness of Ra≤0.1 μm by polishing processing.

Effect of Invention

According to the present invention, the metal diaphragm can prevent external leak due to the above-mentioned permeation leak and can be used in a high-temperature environment by exposing the base metal without applying the fluorine resin coating to the clamping region clamped by the clamping portions on the seat side surface. On the other hand, according to the present invention, by applying the fluorine resin coating to the contact region with the seat, the metal diaphragm is prevented from being damaged or abraded even if contact with and separation from the seat are repeated, and seat leak is prevented.

In addition, by applying polishing treatment to the fluorine resin coating, the unevenness of the resin surface can be reduced, and seat leak due to the above-mentioned permeation leak can be reduced. In addition, by reducing the unevenness of the resin surface, the generation of particles due to collision with the seat can be suppressed. Further, by reducing the effective surface area of the fluorine resin coating by polishing processing, it is also possible to reduce the amount of outgassing from the fluorine resin coating and the amount of adsorption of the gas.

Furthermore, since the coating film thickness can be as thin as several tens μm by applying polishing processing, as compared with variations in thickness due to expansion and creep caused by heat when the valve seat is made of resin, the influence has an effect that the change is only a negligible degree. Therefore, even in a piezoelectric control valve having a general stroke range of less than 100 μm, it is possible to cope with the specification in a high-temperature state.

DESCRIPTION OF EMBODIMENTS

Figure 1:
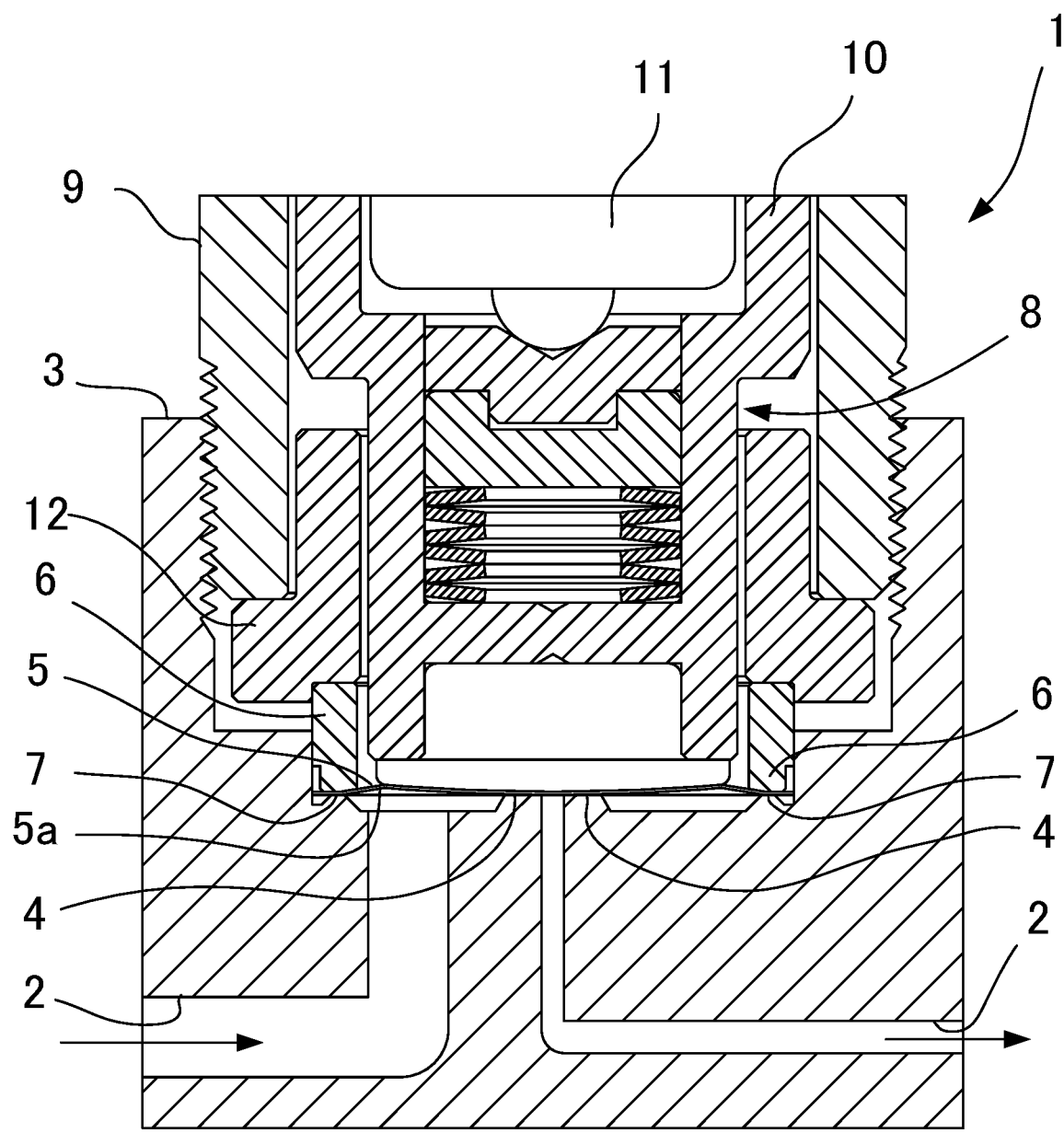
FIG. 1 is an enlarged sectional view showing a main part of an embodiment of the diaphragm valve in a closed state according to the present invention.

One embodiment of the present invention is described below with reference to FIGS. 1-8. The same or similar components are denoted by the same reference numerals throughout the figures.

Figure 2:
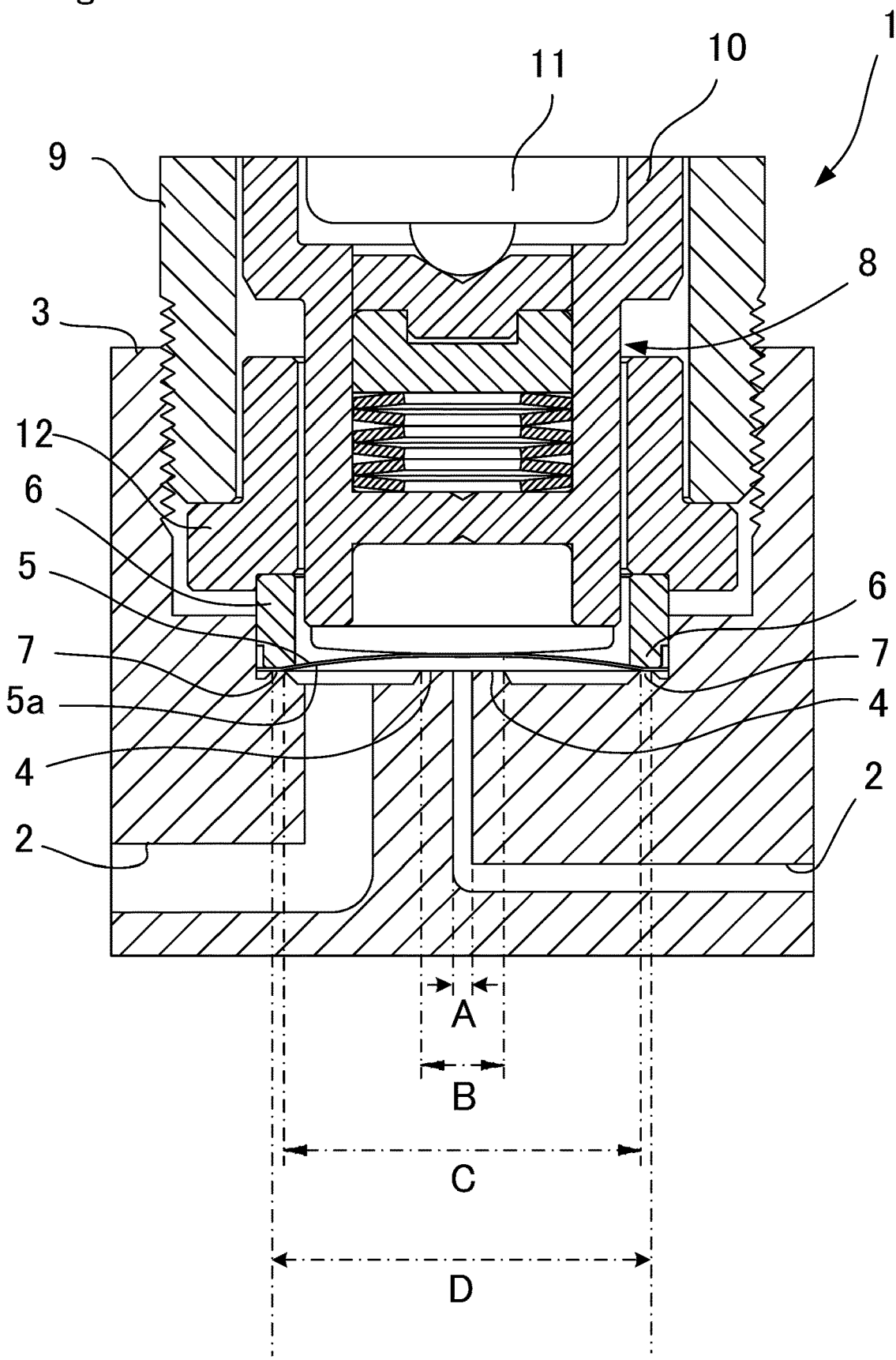
FIG. 2 is an enlarged sectional view showing an open state of the diaphragm valve in FIG. 1.
Figure 3:
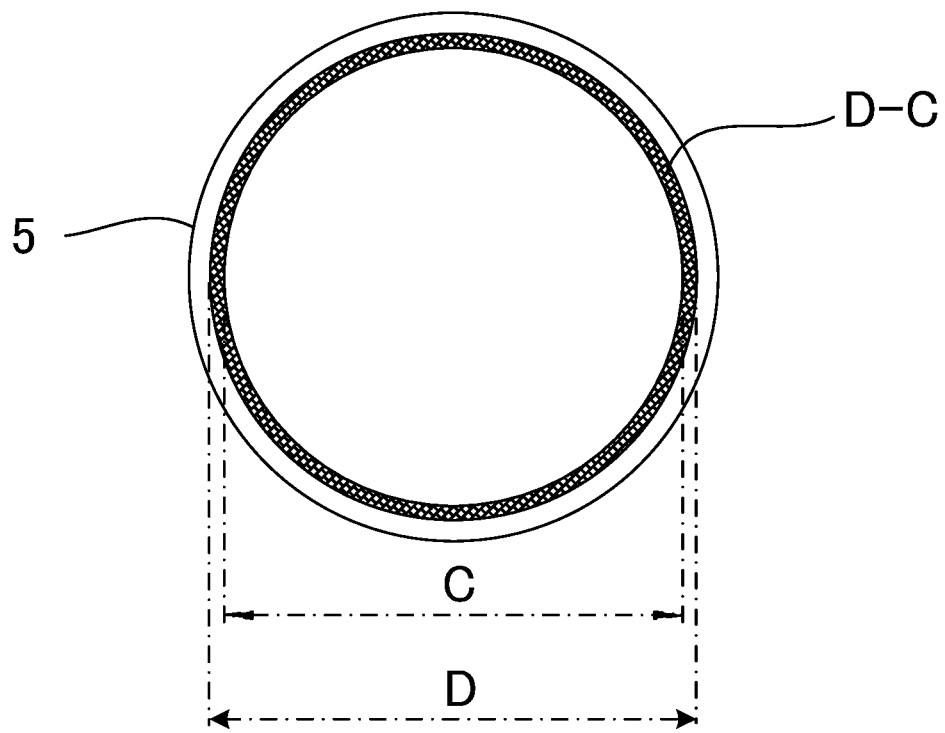
FIG. 3 is a plan view showing a metal diaphragm being a component of the diaphragm valve according to the present invention.
Figure 4:
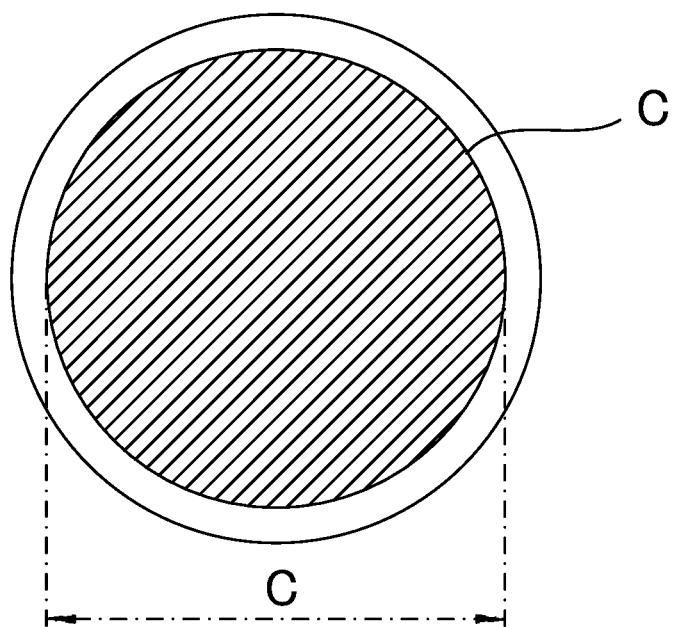
FIG. 4 is a plan view showing a metal diaphragm being a component of a diaphragm valve according to the present invention.
Figure 5:
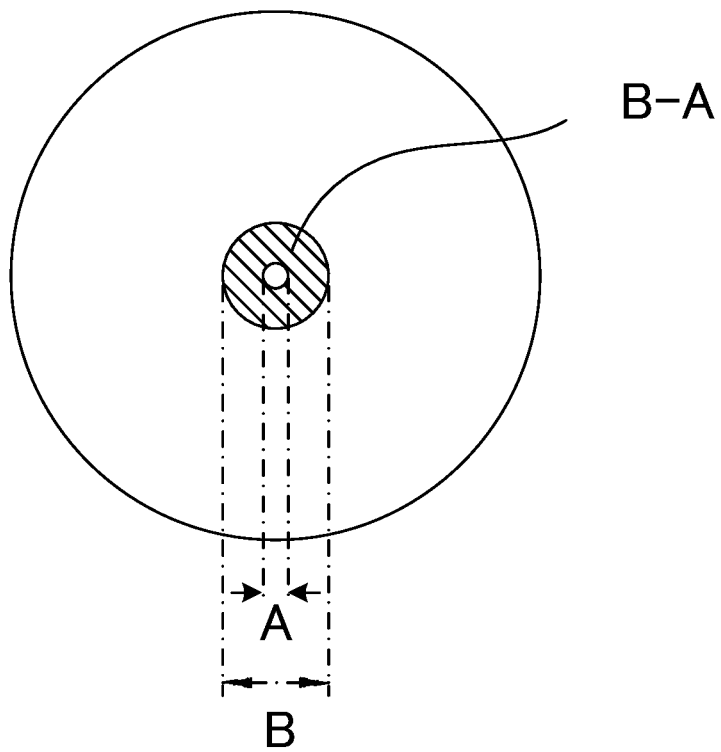
FIG. 5 is a plan view showing a metal diaphragm being a component of a diaphragm valve according to the present invention.

Referring to FIGS. 1 and 2, a diaphragm valve 1 includes a body 3 having a flow path 2 formed therein, a seat 4 formed in the flow path 2, a metal diaphragm 5 for opening and closing the flow path 2 by abutting on or separating from the seat 4, a pair of clamping portions 6 and 7 for clamping peripheral edge portions of both side surfaces of the metal diaphragm 5 respectively to fix the metal diaphragm 5 to the body 3, and an actuator 8 for abutting or separating the metal diaphragm 5 on or from the seat 4.

The body 3 may be formed of a metal such as stainless steel. Each of the clamping portions 6 and 7 may be formed of a metal including an alloy. In the illustrated example, the clamping portion 7 abutting on the seat side surface 5a of the metal diaphragm 5 is integrally formed in the body 3 at an opening portion formed in the flow path 2 of the body 3.

The clamping portion 6 presses the metal diaphragm 5 by screwing a cylindrical guide member 9 into the body 3 via a bridge 12 described later. As a result, the metal diaphragm 5 is fixed to the body 3 by being clamped by the clamping portion 6 and the clamping portion 7 at the peripheral edge portions of both side surfaces.

Figure 7:
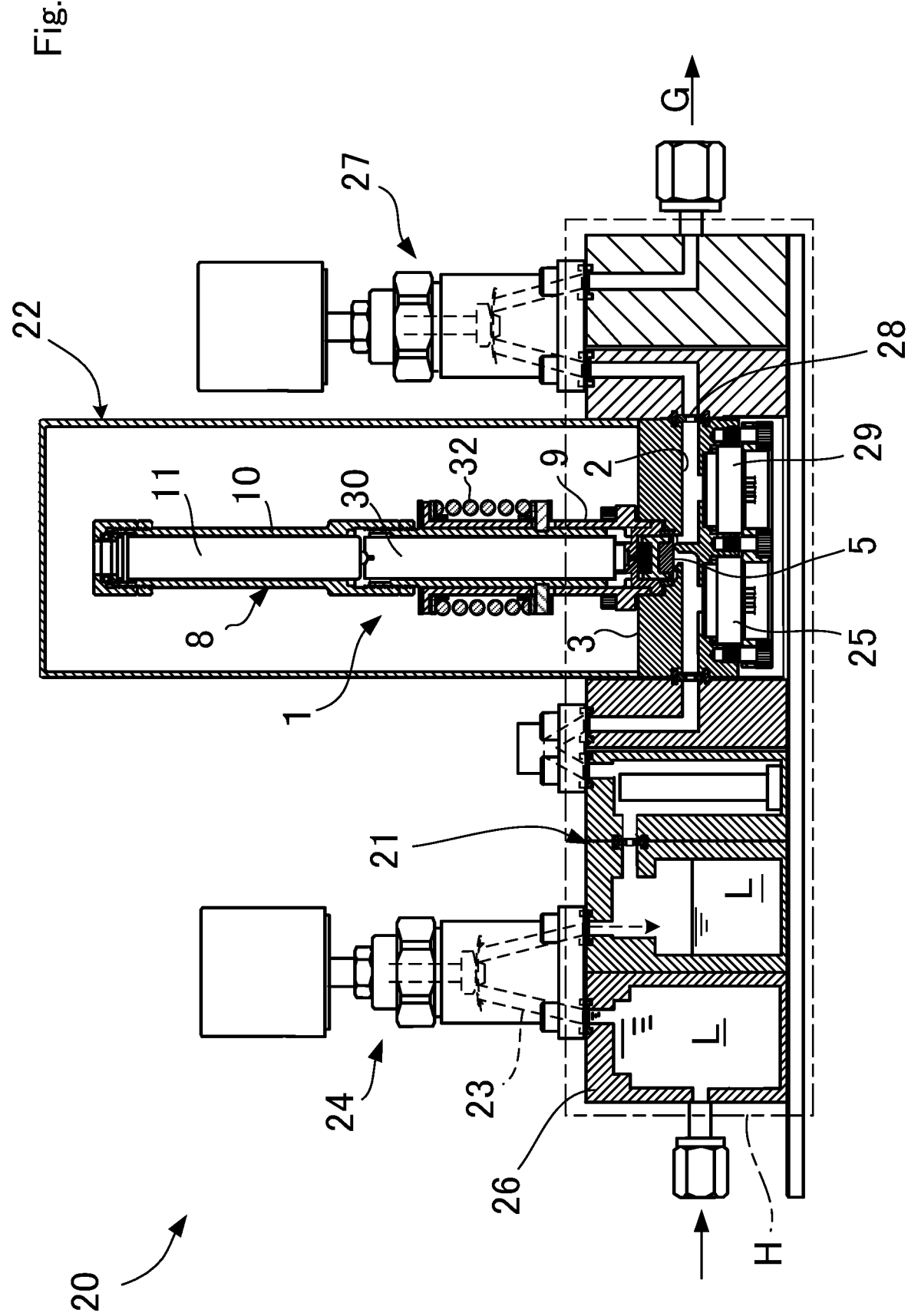
FIG. 7 is a cross-sectional view showing a vaporizer supply device including a diaphragm valve in another embodiment according to the present invention.

A valve stem case 10 is slidably supported by the cylindrical guide member 9. The bridge 12 extends through the valve stem case 10 into the valve stem case 10 and supports a piezoelectric element 11 housed in the valve stem case 10. The piezoelectric element 11 is extended by a voltage application, and this extension is used to constitute an actuator 8 for abutting or separating the metal diaphragm 5 on or from the seat 4. This type of actuator is known, for example, from WO 2011/067891, WO 2016/174832, and the like, and therefore a detailed description is omitted. There are a normally closed type and a normally open type in this kind of diaphragm valve. Further, in this kind of diaphragm valve, for high-temperature gas, there is also a type for accommodating a spacer formed of an inner or the like below the piezoelectric element in the valve stem case (FIG. 7).

The metal diaphragm 5 is formed in a disc shape by an ultra-thin metal plate. The base material of the metal diaphragm 5 is formed of a metal including an alloy, such as spron. The metal diaphragm 5 is not particularly limited but may have a diameter of 5 to 50 mm and a thickness of 20 to 400 µm, for example.

On a seat side surface 5a, which is the side in contact with the seat 4, of the metal diaphragm 5, a fluorine resin coating is formed in a region excluding a clamping region D-C (FIG. 3), in which the seat side surface 5a is clamped by the clamping portion 7, and at least a contact region B-A (FIG. 5) of the seat 4 in an inner region C (FIG. 4) surrounded by the clamping region D-C. In the region where the fluorine resin coating is formed, the contact region B-A (FIG. 5) with the seat 4 is the minimum region, and the region C (FIG. 4) surrounded by the clamping region D-C is the maximum region.

Figure 6:
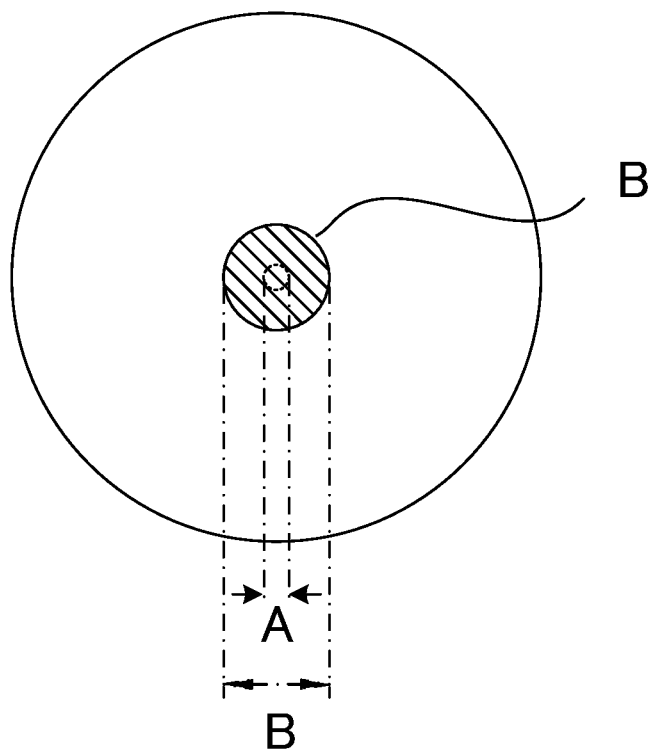
FIG. 6 is a plan view showing a metal diaphragm being a component of a diaphragm valve according to the present invention.

In one embodiment, as shown in FIG. 6, the fluorine resin coating is formed only in the contact region B-A with the seat 4, and a region A surrounded by the contact region B-A with the seat 4, that is, only in a region B. In one embodiment, the fluorine resin coating is formed in an entire region C (FIG. 4) surrounded by the first contact region D-C.

The fluorine resin coating preferably has a thickness of approximately 20 to 50 µm, and in the illustrated example, a thickness of 20 to 25 µm is obtained by polishing processing after coating PFA (perfluoroalkoxy fluorine resin) with a thickness of 30 to 35 µm. The fluorine resin coating has, for example, a surface roughness Ra≤0.8 µm before polishing processing, and may be made to Ra≤0.1 µm by polishing processing. The effective surface area of this surface roughness is reduced by setting Ra≤0.1 µm, and the adhesion of foreign material is reduced. The surface roughness is preferably Ra≤0.05 µm, more preferably Ra≤0.02 µm. The fluorine resin coating may be formed of other fluorine resins such as PTFE resin (polytetrafluoroethylene), FEP resin (tetrafluoroethylene/hexafluoride propylene copolymer) or the like instead of PFA.

An adhesive layer may be provided as a base between the fluorine resin coating and the base material (a metal material such as spron) of the metal diaphragm 5. The adhesive layer may be formed, for example, by applying aging heat treatment to a layer of PAI (polyamideimide) having a thickness of 5 to 10 µm.

Since no fluorine resin coating is formed in the clamping region D-C, and the clamping portion 7 is in pressure contact with the base metal of the metal diaphragm 5, it is possible to prevent a permeation leak in which a gas having a small molecular diameter permeates through the resin. As a result, permeation leak of gas from the peripheral portion of the metal diaphragm 5 to the outside of the diaphragm valve 1 can be prevented. It was confirmed that permeation leak was prevented even in helium leak test by vacuum method.

In addition, since the fluorine resin coating is formed in the contact region B-A (FIG. 5) between the metal diaphragm 5 and the seat 4, damage or the like of the metal base material can be prevented, and seat leak can also be prevented. Further, by forming the fluorine resin coating in the entire region C surrounded by the clamping region D-C, the metal diaphragm 5 protects the entire region of the portion in contact with the process gas, and corrosion due to decomposition products or the like of the process gas can be prevented.

In addition, by applying polishing processing to the fluorine resin coating, the above-mentioned permeation leak can be reduced by reducing the unevenness of the resin surface. In addition, by reducing the unevenness of the fluorine resin coating surface by polishing processing, it is possible to suppress the generation of particles due to collision with the seat 4. Further, by reducing the effective surface area of the fluorine resin coating by polishing processing, it is also possible to reduce the amount of outgassing and adsorption of gas from the fluorine resin coating.

A seat leak test using a vaporization supply device that is a combination of a fluid controller incorporating a diaphragm valve having the above configuration and a vaporizer will be described next.

FIG. 7 is a cross-sectional view showing a schematic configuration of the vaporization supply device. The vaporization supply device 20 includes a vaporizer 21 for heating and vaporizing a liquid raw material L by a heater H, a flow rate control device 22 for controlling the flow rate of the gas G delivered from the vaporizer 21, a first on-off valve 24 interposed in a supply path 23 of the liquid raw material L to the vaporizer 21, and a pressure detector 25 for detecting the pressure of the gas G vaporized by the vaporizer 21 and delivered to the flow rate control device 22. A block body 26 for preheating the liquid material L is connected to the vaporizer 21. A second on-off valve 27 is connected to the downstream side of the flow rate control device 22.

With reference to FIG. 7 and its portion enlarged view 8, the body 3 of the diaphragm valve 1 is provided with a perforated thin plate 28 formed with a micropore, which is interposed in the flow path 2 downstream of the metal diaphragm 5, a pressure detector for flow control 29 for detecting the pressure in the flow path 2 between the metal diaphragm 5 and the perforated thin plate 28, and the flow rate control pressure detector 22 controls an actuator 8 based on the detected value of the pressure detector for flow control 29. The actuator 8 includes the valve stem case 10 that is slidably inserted into the cylindrical guide member 9, a bridge 12 that is pressed and fixed to the body 3 by the cylindrical guide member 9 through holes 10a, 10a being formed in the lower portion of the valve stem case 10, a heat radiating spacer 30 and a piezoelectric element 11 that are supported by the bridge 12 and accommodated in the valve stem case 10, a flange receiving 10b extending through the hole 9a formed in the cylindrical guide member 9 and being protruded on the outer periphery of the valve stem case 10, a flange member 31 mounted on a flange receiving 10b, a flange portion 9b formed on the upper end portion of the cylindrical guide member 9, and a coil spring 32 arranged in a compressed state between the flange portion 9b and the flange member 31. The heat radiating spacer 30 is formed of an invar material or the like, to prevent the piezoelectric element 11 from becoming a heat-resistant temperature or higher even when a high-temperature gas is flowing in the flow path 2.

Figure 8:
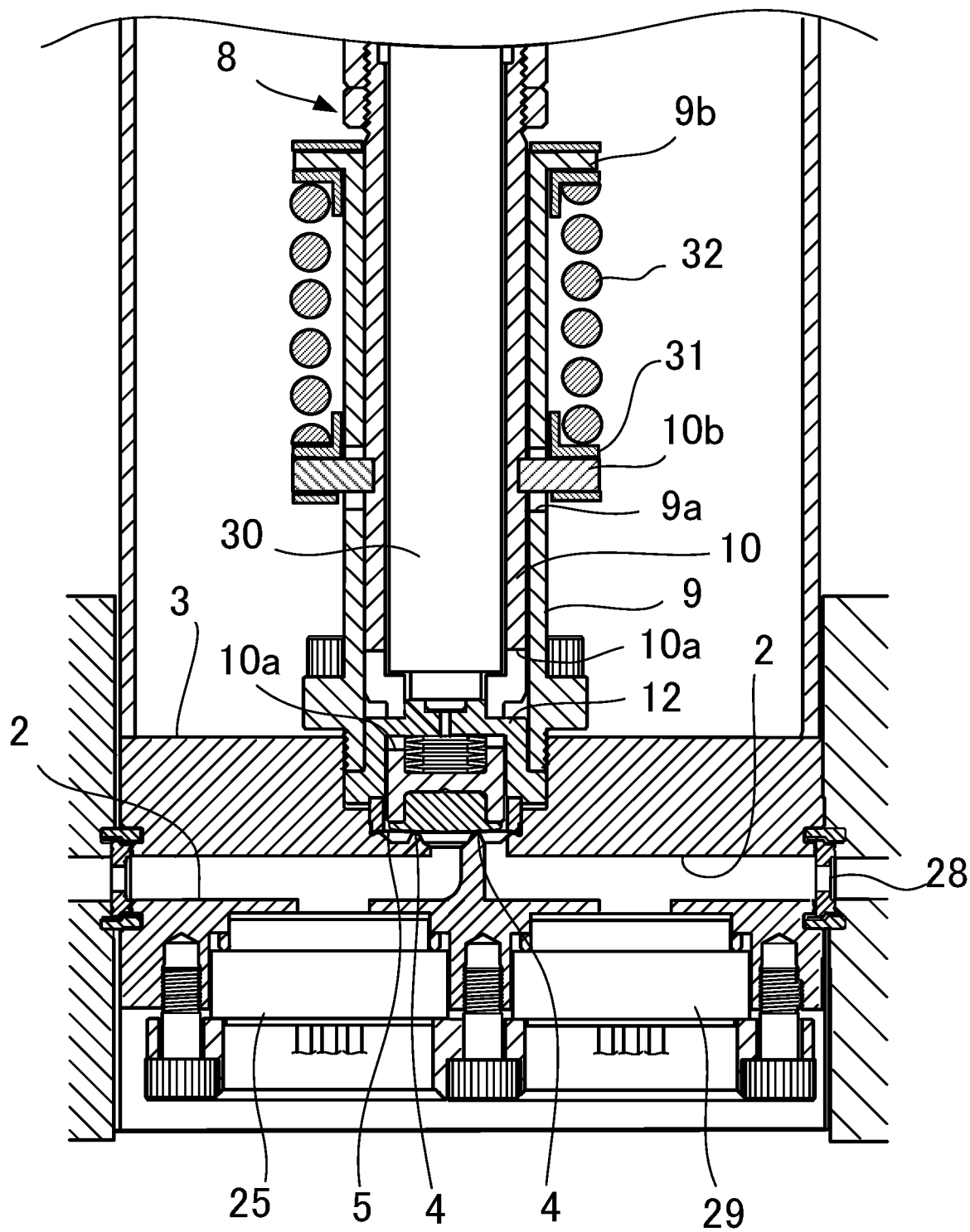
FIG. 8 is a partially enlarged cross-sectional view of the vaporizer supply device of FIG. 7.
Figure 9:
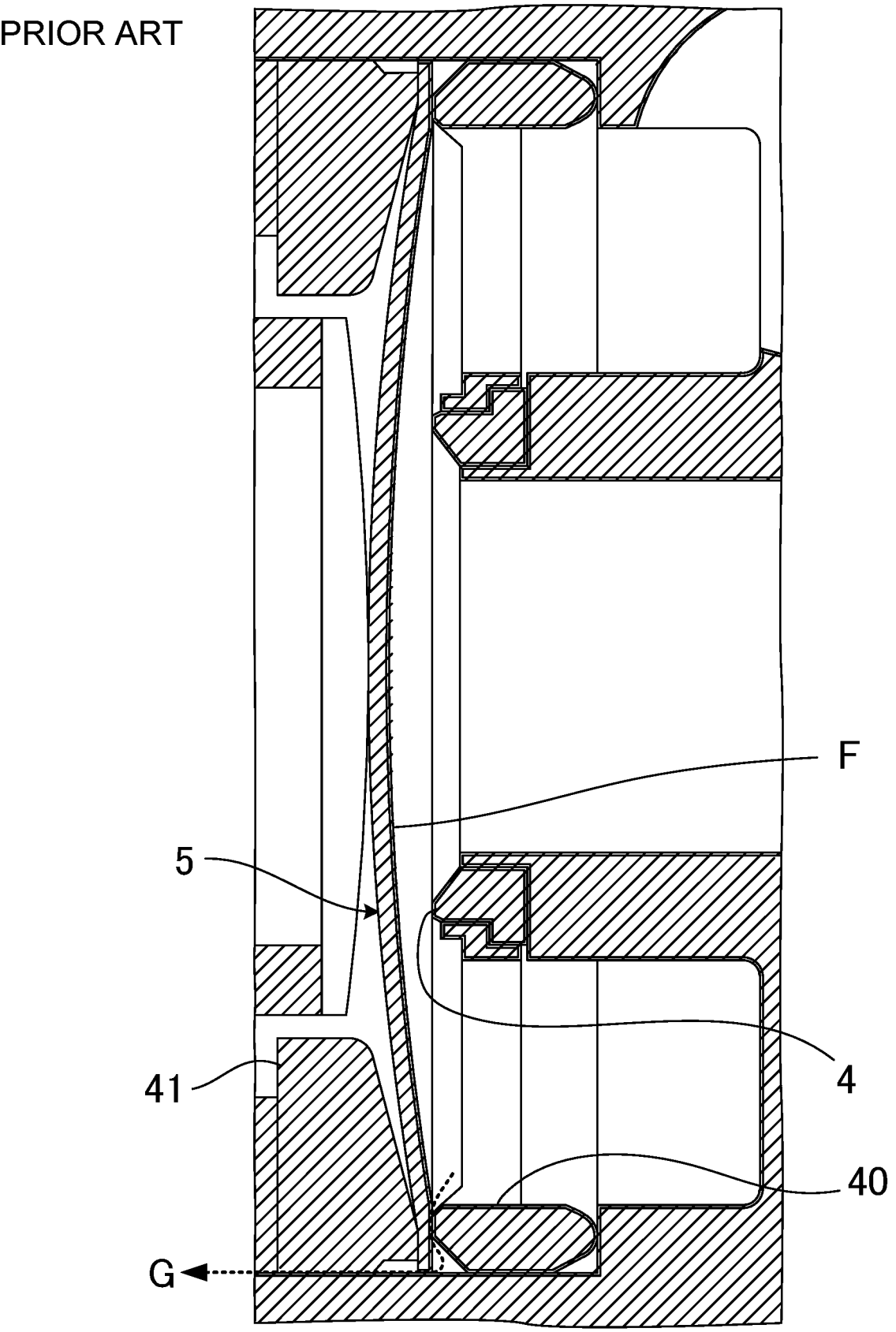
FIG. 9 is an enlarged sectional view of a main part of a conventional diaphragm valve.

During de-energization of the piezoelectric element 11, the valve stem case 10 is pushed down by the coil spring 32 in FIG. 7, and as shown in FIG. 8, the metal diaphragm 5 abuts on the seat 4 and closes the flow path 2. By energizing the piezoelectric element 11, the piezoelectric element 11 is extended, the valve stem case 10 is lifted against the elastic force of the coil spring 32 upward in FIG. 8, the metal diaphragm 5 is returned to the original reverse dish shape by self-elastic force (see FIG. 2), and the flow path 2 is opened. The shape of the seat 4 and the flow path 2 of the diaphragm valve 1 shown in FIGS. 7 and 8 are different from the seat 4 and the flow path 2 shown in FIGS. 1 and 2.

The flow rate control device 22 detects the gas pressure of at least upstream of the perforated thin plate 28 by the pressure detector for flow control 29, and controls the flow rate by driving the piezoelectric element 11 based on the detected pressure signal to open and close the metal diaphragm 5 interposed in the flow path 2. When the absolute pressure upstream of the perforated thin plate 28 is about twice or more of the absolute downstream pressure of the perforated thin plate 28 (critical expansion condition), the gas passing through the micropores of the perforated thin plate 28 becomes the sound velocity, and the flow rate does not exceed the sound velocity, therefore, the flow rate depends only on the upstream pressure of the micropores, so the flow rate passing through the micropore of the perforated thin plate 28 is proportional to the pressure. This principle is utilized. Although not shown, by detecting the downstream pressure of the perforated thin plate 28, it is also possible to control the flow rate based on the differential pressure of the upstream side and downstream side of the perforated thin plate 28. Although the perforated thin plate 28 in the illustrated example is an orifice plate having an orifice, the pore of the perforated thin plate 28 is not limited to the orifice and may be any structure that restricts fluid. The conditions for the seat leak test are as follows:

The metal diaphragm was made of spron 510 and 15 mm in diameter. The fluorine resin coating was made of PFA, and was formed in the entire region surrounded by the clamping region with a surface roughness Ra≤0.02 μm after polishing processing and a thickness of about 20 to 25 μm after polishing processing (the embodiment shown in FIG. 4). The underlying adhesive layer is made of PAI and had a thickness of 5 to 10 μm.

An all-metal metal diaphragm without a fluorine resin coating is used as a comparative example.

The test method was performed by the following procedure.

Step 1: After heating the body 3 of the flow rate control device 22 to 210° C., close the diaphragm valve 1, open the second on-off valve 27, and reduce the pressure (vacuum) of the secondary side of the diaphragm valve 1.

Step 2: Open the first on-off valve 24 for 2 seconds, seal the TEOS (tetraethoxysilane) inside the vaporizer 21, and set the pressure of the pressure detector 25 to a high-temperature and high-pressure condition of 210° C. and 200 kPa (abs).

Step 3: From the output of the pressure detector for flow control 29 after 2 minutes from the moment when closing the second on-off valve 27, calculate the amount of seat leak using the build-up method.

The build-up method measures the flow rate (Q) using the relationship of $Q=(\Delta P/\Delta t) \times V/RT$ (R is a gas constant) by measuring the pressure rise rate ($\Delta P/\Delta t$) and temperature (T) within a predetermined volume (build-up volume V) interposed in the flow path. In the present seat leak test, the build-up volume V is the volume in the flow path from the diaphragm valve 1 to the second on-off valve 27, which was 2.23 cc.

As a result of the above-mentioned seat leak test, when the opening and closing of the diaphragm valves were repeated 500,000 times, there was a leak exceeding $4.2 \times 10^{-5}$ Pa·m$^3$ per second, which was a criterion, in the comparative example, but there was almost no leak in the example.

The present invention is not construed as being limited to the above-mentioned embodiments, and various modifications are possible within a range that does not depart from the spirit of the present invention.

DESCRIPTION OF NUMERALS

1 Diaphragm valve
2 Flow path
3 Body
4 Seat
5 Metal diaphragm
6, 7 Clamping portion
8 Actuator

What is claimed is:
1. A diaphragm valve comprising:
a body having a flow path formed therein;
a seat formed in the flow path;
a metal diaphragm consisting of a flexible disc shaped metal plate which changes shape for opening and closing the flow path by abutting or separating from the seat, the metal diaphragm having a seat side surface, the seat side surface having
   a clamping region, and
   a first region including a seat contact region wherein the metal diaphragm contacts the seat, the first region being immediately surrounded by and excluding the clamping region;
a pair of clamping portions for clamping peripheral edge portions of both side surfaces of the metal diaphragm respectively to fix the metal diaphragm to the body;
a piezo actuator with a stroke range of less than 100 microns for abutting the metal diaphragm to the seat or separating the metal diaphragm from the seat; and
a fluorine resin coating formed on the seat side surface of the metal diaphragm in the first region, at least in the seat contact region;
wherein the fluorine resin coating is excluded from the clamping region,
wherein the fluorine resin coating has a surface roughness Ra of less than or equal to 0.05 μm and a thickness of 20 to 25 microns by polishing processing,
wherein the metal diaphragm has a thickness of 20 to 400 microns, and
wherein an adhesive layer is provided between the fluorine resin coating and the metal diaphragm, the adhesive layer being formed by applying an aging heat treatment and having a thickness of 5 to 10 microns.

2. The diaphragm valve according to claim 1, wherein the fluorine resin coating is formed in an entirety of the first region.

3. The diaphragm valve according to claim 1, wherein the fluorine resin coating is formed only in the seat contact region.

4. The diaphragm valve according to claim 1, wherein the fluorine resin coating is formed only in the seat contact region and a second region surrounded by the seat contact region.

5. The diaphragm valve according to claim 1, wherein one of the pair of clamping portions in contact with the seat side surface of the metal diaphragm is made of metal.

* * * * *